United States Patent
Sada et al.

(10) Patent No.: US 7,270,914 B2
(45) Date of Patent: Sep. 18, 2007

(54) LITHIUM SECONDARY CELL

(75) Inventors: Tsutomu Sada, Otsu (JP); Kazunari Takeda, Tsurugashima (JP); Yumiko Takashima, Tano-gun (JP); Naoto Nishimura, Kashihara (JP); Takehito Mitate, Yamatotakada (JP); Kazuo Yamada, Kitakatsuragi-gun (JP); Motoaki Nishijima, Gose (JP); Naoto Torata, Kashihara (JP)

(73) Assignee: Sharp Corporation, Osaka (JP)

( * ) Notice: Subject to any disclaimer, the term of this patent is extended or adjusted under 35 U.S.C. 154(b) by 539 days.

(21) Appl. No.: 10/381,886

(22) PCT Filed: Sep. 28, 2001

(86) PCT No.: PCT/JP01/08521

§ 371 (c)(1),
(2), (4) Date: Sep. 29, 2003

(87) PCT Pub. No.: WO02/27853

PCT Pub. Date: Apr. 4, 2002

(65) Prior Publication Data

US 2005/0100788 A1    May 12, 2005

(30) Foreign Application Priority Data

Sep. 29, 2000 (JP) .............................. 2000-297753

(51) Int. Cl.
H01M 4/62 (2006.01)
H01M 4/58 (2006.01)
H01M 10/40 (2006.01)

(52) U.S. Cl. .................... 429/217; 429/231.1; 429/317

(58) Field of Classification Search ............... 429/217, 429/231.4, 231.8, 231.95, 317, 231.1
See application file for complete search history.

(56) References Cited

U.S. PATENT DOCUMENTS 6,096,456 A * 8/2000 Takeuchi et al. ............ 429/249

FOREIGN PATENT DOCUMENTS

| JP | 6-96800 A | | 4/1994 |
| JP | 08329983 A | * | 12/1996 |
| JP | 10218913 A | * | 8/1998 |
| JP | 11317228 A | * | 11/1999 |
| JP | 2000-90925 A | | 3/2000 |
| JP | 2000-188131 A | | 4/2000 |
| JP | 2000156230 A | * | 6/2000 |
| JP | 2001023695 A | * | 1/2001 |
| JP | 6-290810 A | | 11/2001 |
| JP | 2001-319693 A | | 11/2001 |
| JP | 2001-332301 A | | 11/2001 |

OTHER PUBLICATIONS

D. Linden, "Handbook of Batteries", 2nd Edition, McGraw-Hill, Inc. 1995, pp. 36.3-36.9.*
International Search Report mailed Dec. 25, 2001 in corresponding PCT Application No. PCT/JP01/08523.
English translation of International Preliminary Examination Report mailed Aug. 4, 2003 in corresponding PCT Application PCT/JP01/08521.

* cited by examiner

*Primary Examiner*—Gregg Cantelmo
(74) *Attorney, Agent, or Firm*—Nixon & Vanderhye P.C.

(57) ABSTRACT

In a lithium secondary cell having a negative electrode, a positive electrode and, arranged between the electrodes, a polymer electrolyte layer, the internal resistance of the cell and the interfacial resistance between the electrode and the polymer electrolyte can be reduced by incorporating into the electrode, in advance, a polymer electrolyte precursor solution in a manner such that the electrode has a higher content of the precursor monomer and/or an oligomer thereof than that in the polymer electrolyte layer formed on the electrode.

9 Claims, 3 Drawing Sheets

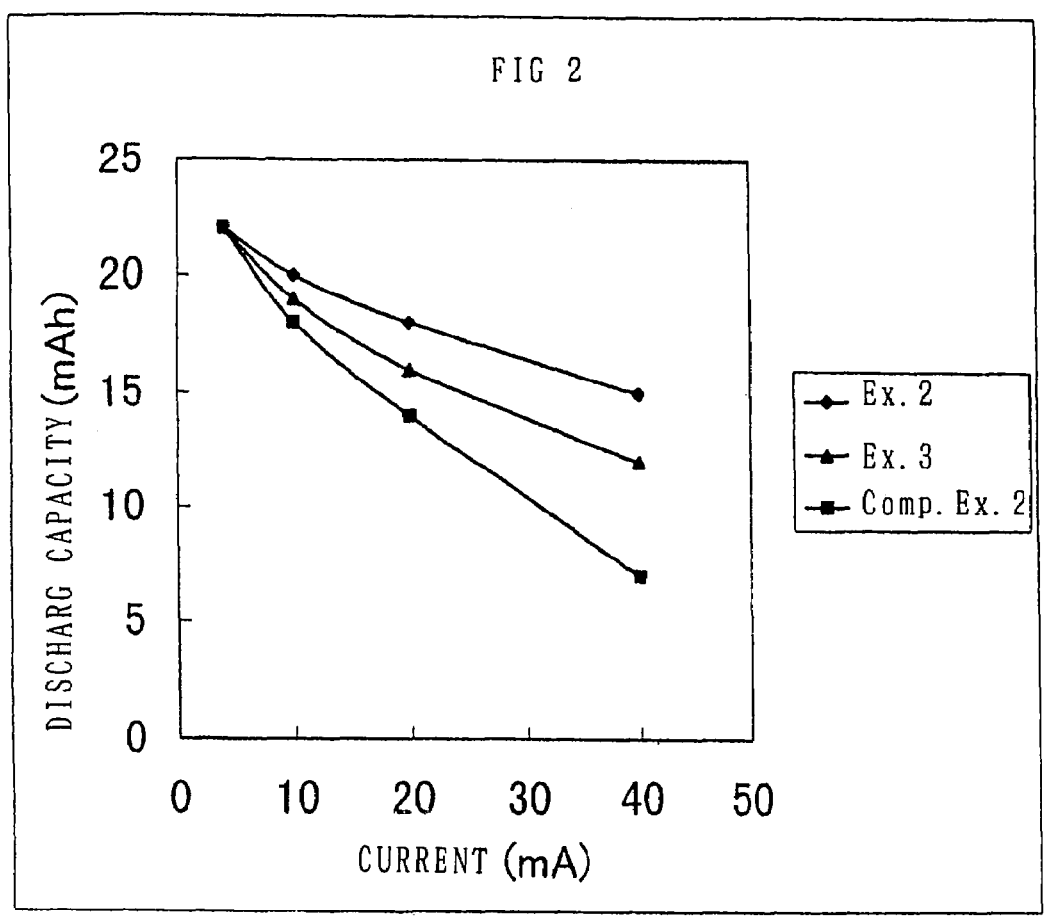

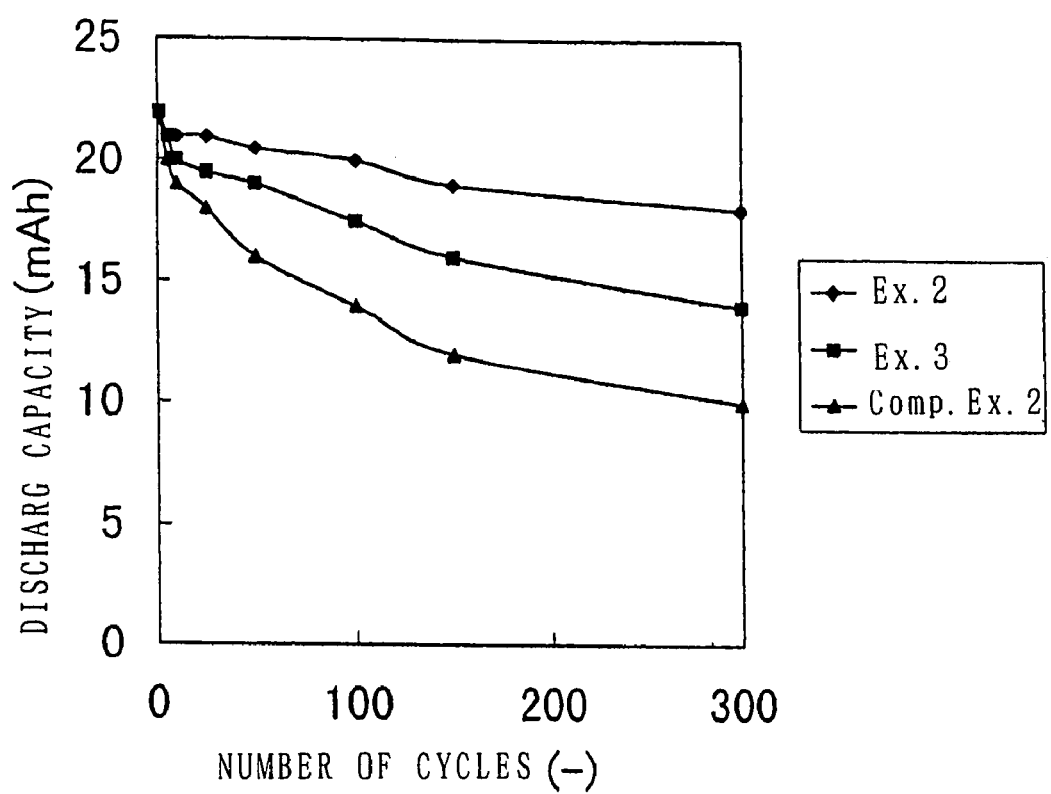

LITHIUM SECONDARY CELL

This application is a 371 U.S. national phase of international application PCT/JP01/08521 filed 25 Sep. 2001 which designates the U.S.

FIELD OF THE INVENTION

This invention relates to a lithium secondary battery. More particularly, it relates to a lithium secondary battery which includes a polymer electrolyte comprising a matrix of ion-conductive polymer retaining a nonaqueous electrolyte solution.

BACKGROUND ART

Following lithium ion batteries using a nonaqueous electrolyte solution, much interest has been drawn to a lithium polymer battery using a polymer electrolyte due to popularization of small size portable electronic instruments. The battery of this type is advantageous over the lithium ion battery in that it enables much lighter and thinner batteries to be manufactured and makes the battery leak-free. However, some disadvantages may be seen compared with the lithium ion battery such as decreased current characteristics under heavy loads due to solid state electrolyte.

One of causes thereof is thought to be the internal resistance within the electrode and/or interfacial resistance between the solid electrolyte and the electrode in the battery.

The polymer electrolyte is comprised of a matrix of ion-conductive polymer retaining a nonaqueous electrolyte solution therein and produced by casting the nonaqueous electrolyte solution containing a precursor monomer of the ion-conductive polymer onto the electrode and polymerizing the monomer in situ.

JP-A-10218913 discloses that the interfacial resistance between the polymer electrolyte and the electrode may be decreased by decreasing the amount of unreacted monomer and oligomers of the matrix polymer in the polymer electrolyte to less than 30 weight %. Since this technology is not concerned about the improvement of the internal resistance of the electrode, there remains to exist a problem how the internal resistance of the electrode may be improved.

DISCLOSURE OF THE INVENTION

Generally an electrode comprises a metal conductor for collecting current and a layer of electroactive substance. In the lithium secondary batter, at least the cathode electroactive substance layer is formed by binding a particulate electroactive substance and optionally a particulate electroconductive material with a binder material. The electroactive substance layer for the anode may also be formed by binding particulate electroactive substance and optionally particulate conductor material with a binder material for use as an alternative of lithium metal or lithium alloys. The cases where the internal resistance within the electrode develops to a problem are where the electroactive layer contains a particulate substance. If a continuous phase of the polymer electrolyte is not formed across the electroactive substance layer from the collector member, the internal resistance within the electrode and the interfacial resistance will be increased.

Accordingly, the present invention provides a lithium secondary battery comprising an anode having an electroactive substance layer ether made of lithium metal or a lithium alloy, or comprised of a carbonaceous material capable of electrochemically inclusion and release of lithium, a cathode having an electroactive substance layer comprised of a chalcogenide compound containing lithium and a polymer electrolyte layer between the cathode and the anode comprised of a matrix of ion-conductive polymer retaining a nonaqueous eletrolyte solution therein. The battery of the present invention is characterized in that the anode and/or cathode contain in the interior thereof a precursor of said ion-conductive polymer and/or a polymer thereof having a low polymerization degree.

BRIEF DESCRIPTION OF THE DRAWINGS

FIG. 2 is a similar graph to the graph of FIG. 1 showing the discharge capacity of the batteries according to Examples 2 and 3 of the present invention in comparison with the battery according to Comparative Example 2.

FIG. 3 is a graph showing the results of charge-discharge cycling test on the batteries of Examples 2 and 3 in comparison with battery according to Comparative Example 2.

BEST MODE FOR CARRYING OUT OF THE INVENTION

Figure 1:
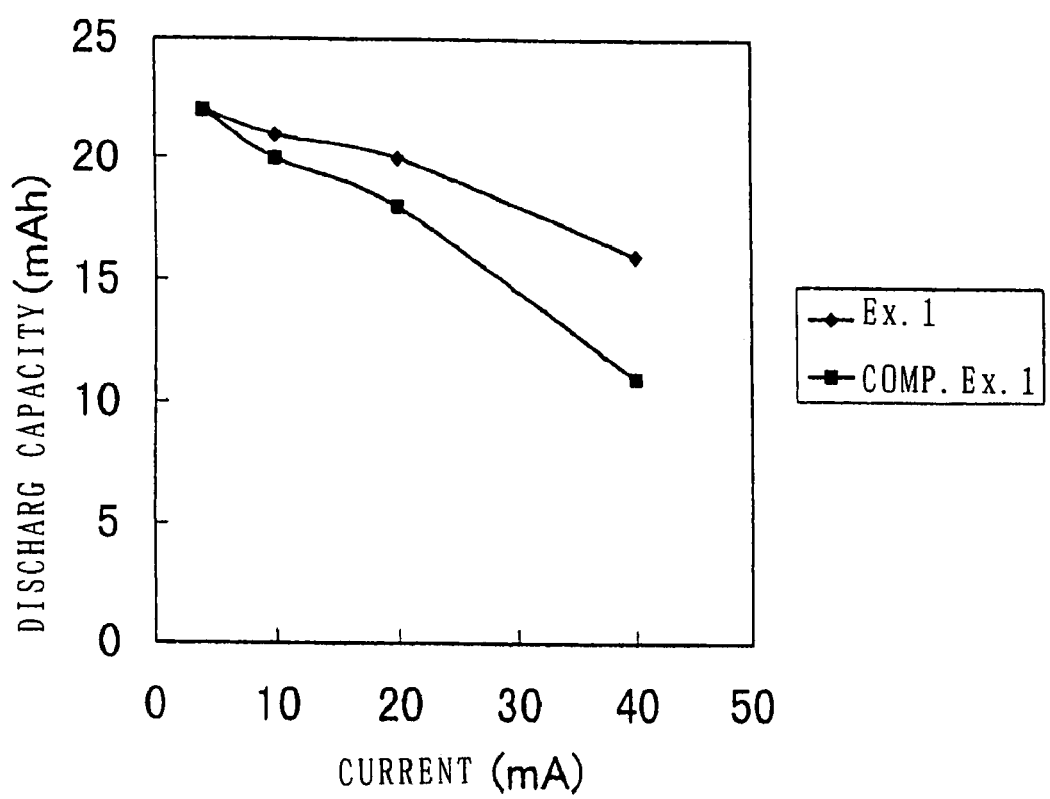
FIG. 1 is a graph showing the discharge capacity at different current values of the battery according to Example 1 of the present invention in comparison with the battery according to Comparative Example 1.

The battery of the present invention may be manufactured by forming an ion-conductive polymer layer separately on a pre-fabricated cathode and anode and joining the layers together although the manufacturing process is not limited thereto.

Examples of anodic electroactive substances include lithium metal, a lithium-aluminum alloy, a lithium-lead alloy, a lithium-tin alloy, a lithium-aluminum-tin alloy, a lithium-gallium alloy, Wood's alloy and other alloys containing lithium but are not limited thereto. These anodic substances may be used alone or in combination.

It is also possible to use as the anodic electroactive substance a carbonaceous material capable of electrochemically inclusion and release of lithium such as graphite. More preferably, the carbonaceous material is graphite particles having attached on the surfaces thereof amorphous carbon particles. These particles may be obtained by dipping the graphite particles in a coal-based heavy oil such as coal tar or pitch or a petroleum-based heavy oil and heating recovered graphite particles to a temperature above the carbonizing temperature to decompose the heavy oil, if necessary, followed by milling. Such treatment significantly retards the decomposing reaction of the nonaqueous electrolyte solution and the lithium salt occurring at the anode during the charge cycle to enable the charge and discharge cycle life to be improved and also the gas evolution due to the above decomposition reaction to be prevented.

Examples of the cathodic electroactive substances which are usable in the present invention include oxides of metals of group 4A and 4B of the periodic chart such as $TiS_2$, $SiO_2$, or $SnO$; oxides of metals of 5A and 5B of the periodic chart such as $V_2O_5$, $V_6O_{12}$, $VOx$, $Nb_2O_5$, $Bi_2O_3$ or $Sb_2O_3$; oxides of metals of group 6A and 6B of the periodic chart such as $Cr\ O_3$, $Cr_2O_3$, $MoS_2$, $WO_3$ or $SeO_2$; oxides of metals of group 7A such as $MnO_2$ or $Mn_2O_3$; oxides of metals of group 8 of the periodic chart such as $Fe_2O_3$, $FeO$, $Fe_3O_4$, $Ni_2O_3$, $NiO$, $CoS_2$ or $CoO$; and a metal compound of the general formula:

$Li_aMX_2$ or $Li_aMNbX_2$ wherein M and N are a metal of group 1 to 8 of the periodic chart and X is a chacogen element such as oxygen or sulfur, such as lithium-cobalt composite oxide or lithium-manganese composite oxide, as well as a conductive polymer material such as polypyrrole, polyaniline, polyparaphenylene, polyacetylene or polyacene and a carbonaceous material of pseudographite structure but are not limited thereto.

The cathodic electroactive substance to be used in the present invention in conjunction with the carbonaceous anodic active substance is preferably selected from a composite oxide of laminar or spinel structure represented by the formula: Li a $(A)_b(B)_cO_2$ wherein A is a transition metal element;

B is an element selected from the group consisting of a non-metal or semi-metal element of group 3B, 4B and 5B of the periodic chart, an alkaline earth metal, Zn, Cu and Ti;

a, b and c are numbers satisfying the following relationship:

$0 < a \leq 1.15$ $0.85 \leq b+c \leq 1.30$, and $c > 0$

Typical examples of the composite oxides include $LiCoO_2$, $LiNiO_2$ and $LiCoxNi_{1-x}O_2$ (0<x<1). Use of these compounds in conjunction with a carbonaceous material as an anodic electroactive substance is advantageous in that the battery exhibits a practically acceptable dynamic voltage even when the voltage variation generated by charging and discharging the carbonaceous material per se (about 1 volt vs. $Li/Li^+$), and that lithium ions necessary for charging and discharging the battery are already contained in the form of, for example, $LiCoO_2$ or $LiNiO_2$ before assembling the battery.

The respective electroactive substances may be combined, where necessary, with a chemically stable conductor material such as graphite, carbon black, acetylene black, carbon fiber or conductive metal oxides.

The binder is selected among those thermoplastic resins which are chemically stable, soluble in a suitable solvent but hardly attacked with the nonaqueous electrolyte solution. A variety of such thermoplastic resins have been known. For example, polyvinylidene fluoride (PVDF) may preferably be used since this resin is selectively soluble in N-methyl-2-pyrrolidone.

The electrode may be produced by kneading the respective electroactive substances and, where necessary, the conductor material with a solution of the binder resin to prepare a paste, applying the paste on a metal foil using a suitable coater to form a film of uniform thickness, and compressing the film after drying. The proportion of the binder resin in the electroactive substance layer should be minimum and generally lies from 1 to 15% by weight. The proportion of the conductor material usually lies, when used, from 2 to 15% by weight of the electroactive substance layer.

The polymer electrolyte layer is formed on the respective electroactive substance layers thus prepared integrally therewith. The polymer electrolyte layer is comprised of a matrix of an ion-conductive polymer impregnated with or retaining a nonaqueous electrolyte solution containing a lithium salt. The polymer electrolyte layer occurs macroscopically in a solid state but microscopically retains a continuous phase of the lithium solution formed therein in situ. The polymer electrolyte layer of this type has an ion-conductivity higher than that of the corresponding polymer electrolyte free from the lithium solution.

The polymer electrolyte layer may be formed by polymerizing (heat polymerization, photopolymerization etc.,) a precursor monomer of the ion-conductive polymer in the form of a mixture with the nonaqueous electrolyte solution containing a lithium salt.

The monomer component which can be used for this purpose should include a polyether segment and also be polyfunctional in respect to the polymerization site so that the resulting polymer forms a three dimensional crosslinked gel structure. Typically, such monomers may be prepared by esterifying the terminal hydroxyl groups with acrylic or methacrylic acid (collectively called "(meth)acrylic acid"). As is well known in the art, polyether polyols are produced by addition-polymerizing ethylene oxide (EO) alone or in combination with propylene oxide (PO) using an initiator polyhydric alcohol such as ethylene glycol, glycerine or trimethylolpropane. A monofunctional polyether polyol (meth)acrylate may be used in combination with polyfunctional monomers.

The poly- and monofunctional monomers are typically represented by the following general formulas:

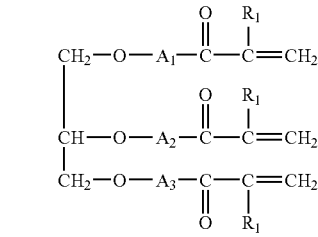

wherein $R_1$ is hydrogen or methyl;

$A_1$, $A_2$ and $A_3$ are each a polyoxyalkylene chain containing at least 3 ethylene oxide (EO) units and optionally some propylene oxide (PO) units such that PO/EO=0.25 and EO+PO$\geq$35.

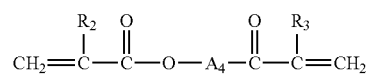

wherein $R_2$ and $R_3$ are hydrogen or methyl;

$A_4$ is a polyoxyalkylene chain containing at least 3 EO units and optionally some PO units such that PO/EO=0-5 and EO+PO$\geq$10.

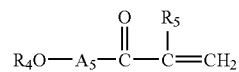

wherein $R_4$ is a lower alkyl, $R_5$ is hydrogen or methyl, and $A_5$ is a polyoxyalkylene chain containing at least 3 EO units and optionally some PO units such that PO/EO=0-5 and EO+PO$\geq$3.

Non-limitative examples of the organic solvents include ethylene carbonate (EC), propylene carbonate (PC), dimethyl carbonate (DMC), diethyl carbonate (DEC), γ-butyrolactone (GBL); and mixtures of these solvents. A mixed solvent of EC with another solvent is preferable.

The nonaqueous electrolyte solution is prepared by dissolving a lithium salt in the above solvent. Non-limitative examples of the lithium salt solutes include $LiClO_4$, $LiBF_4$, $LiAsF_6$, $LiPF_6$, $LiN(CF_3SO_2)_2$ and the like.

The proportion of the nonaqueous solution in the mixture with the precursor monomer should be large enough to maintain the solution as continuous phase in the crosslinked polymer electrolyte layer but should not be so excessive to undergo phase separation and bleeding of the solution from the gel. This can be accomplished by the ratio of the monomer to the electrolyte solution generally within a range from 30/70 to 2/98, preferably within a range from 20/80 to 2/98 by weight.

The monomer-electrolyte solution mixture may contain a suitable polymerization initiator depending on the polymerization method, for example, an initiator of peroxide or azo type in the heat polymerization and a photoinitiator such as 2,2-dimethoxy-2-phenylacetophenone in the photopolymerization. The gelled polymer electrolyte layer may be formed integrally with the respective electrodes by casting the monomer-nonaqueous electrolyte solution mixture on the electroactive substance layers of the resepctive electrodes as a film and polymerizing the film by the heat polymerization or irradiating the film with UV radiation. The battery of the present invention is assembled by joining the polymer electrolyte layers on both electrodes together.

According to the present invention, the electroactive substance layer of either electrode contains, except for lithium metal or lithium alloy anode, in the interior thereof the polymer electrolyte and the polymer electrolyte within the electroactive substance layer contains the precursor monomer and/or a polymer thereof having a low degree of polymerization in a higher proportion than the polymer electrolyte layer between the cathode and the anode. The proportion of said precursor monomer and/or its polymer having a low degree of polymerization in the polymer electrolyte in the interior of the electroactive substance layers lies preferably in the range from 30 to 80% by the total weight of the precursor monomer in terms of the monomer and its dimer.

The polymer electrolyte layer sandwiched between the electrode pair is macroscopically a solid as noted above. In contrast, the polymer electrolyte penetrated into the electrode contains the precursor monomer and/or its polymerization products having a low polymerization degree in larger amount than in the sandwiched polymer electrolyte layer. Therefore, the network structure of the matrix polymer will not be well developed in the electrode and the nonaqueous electrolyte solution retained by the polymer matrix will form a continuous phase more easily in the electrode. It is postulated that this contributes to decreased internal resistance within the electrode and also to decrease interfacial resistance between the electrode and the polymer electrolyte layer.

This can be accomplished by using precursor monomers having different functionality equivalent weights, i.e. the molecular weight divided by the number of polymerizate sites, between the polymer electrolyte within the electrode and the sandwiched polymer electrolyte layer. When two monomers having different equivalent weights are dissolved in a nonaqueous electrolyte solution at the same concentration and the subjected to polymerization under the same condition, a monomer having smaller equivalent weight, namely having higher functionality than the other monomer will be exposed to smaller amount of energy than the other monomer per single polymerization site or group. This will result in greater proportions of the monomer and/or polymers of low polymerization degree in the polymer electrolyte.

This may be accomplished in practice by impregnating the electrode with a monomer having a relatively small functionality equivalent weight in the form of a mixture with the nonaqueous electrolyte solution, casting the corresponding mixture containing a relatively large functionality equivalent weight thereon, and polymerizing both precursor monomers simultaneously with e.g. UV radiation.

The present invention is not limited to the above method nor bound to any theory but includes in scope other methods which are obvious to one skilled in the art. However, the method is most preferable from a procedural point of view since it does not require a special process except provision of two different precursor/nonaqueous electrolyte solution mixtures.

EXAMPLE

The following Examples are for illustrative purpose only and not intended to limit the scope of the present invention thereto.

Example 1

1) Fabrication of Cathode 100 weight parts of maganese dioxide were dry blended with 10 weight parts of acetylene black as a conductor material and 7 weight parts of polyvinylidene fluoride (PVDF) as a binder material. After-adding an appropriate amount of N-methyl-2-pyrrolidone (NMP), the blend was kneaded well. The resulting paste was applied onto an aluminum foil of 20 μm thickness. After drying, the coated foil was compressed to form a sheet and cut into 30×30 mm size. An aluminum collector tab was attached to the cut sheet by welding to prepare a cathode having a thickness of 100 μm.

2) Fabrication of Anode

Li—Al alloy was applied on a Ni mesh under pressure using a press and cut into 31×31 mm size. A Ni collector tab was attached to the cut piece by welding to prepare an anode having a total thickness of 100 μm.

3) Nonaqueous Electrolyte Solution $LiPF_6$ was dissolved in a mixed solvent of propylene carbonate (PC), ethylene carbonate (EC) and diethyl carbonate (DEC) at a volumetric ratio of 35:35:30 to prepare a nonaqueous electrolyte solution.

4) Fabrication of Polymer Electrolyte Layer Anode Side:

Into the above nonaqueous electrolyte solution was dissolved at 10 weight % concentration a trifunctional polyether polyacrylate having a molecular weight of about 8,000 of the formula:

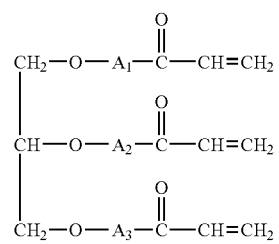

wherein $A_1$, $A_2$ and $A_3$ are each polyoxyalkylene chain containing at least 3 EP units and at least one PO unit at PO/EO ratio of 0.25. The precursor solution was prepared by adding 2,2-dimethoxy-2-phenylacetophenone (DMPA) at a 0.1 weight % concentration. This solution was applied onto the anode as prepared above and then irradiated with UV radiation of 365 nm wavelength at an intensity of 38 mW/cm² for 2 minutes to form a polymer electrolyte layer having a thickness of 40 μm integrally with the anode.

Cathode Side:

Into the above nonaqueous electrolyte solution was dissolved at 10 weight % concentration a bifunctional polyether polyacrylate having a molecular weight of about 3,000 of the formula:

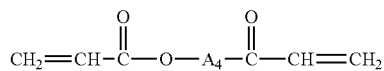

wherein $A_4$ is a polyoxyalkylene chain containing at least 3 EO units and at least one PO unit at PO/EO ratio of 0.25. Thereafter, DMPA was added to a 0.1 weight % concentration.

The cathode was dipped overnight in this solution and then in the precursor solution as used in the preparation of the polymer electrolyte on the anode for one minute. Immediately after taking out from the second electrolyte solution, the cathode was irradiated with UV radiation of 365 nm wavelength at an intensity of 38 mW/cm² for two minutes to form a polymer electrolyte layer integrally with the cathode.

The total thickness of the finished cathode remained almost the same as before this step.

5) Assembly of Battery

The cathode and the anode each having a polymer electrolyte layer formed integrally therewith by the above procedures were joined together with their polymer electrolyte layers facing inwardly. The assemblage was placed in an envelope made of aluminum foil laminate having a thermoplastic film layer on both side and the hermetically heat sealed under reduced pressure to obtain an assembled battery.

Comparative Example 1

Example 1 was repeated except that the pre-impregnation step of cathode with the precursor solution containing the bifunctional polyether polyacrylate having a molecular weight of about 3,000 was dispensed with and the cathode was dipped in the precursor solution containing the trifunctional polyether polyol having a molecular weight of about 8,000 overnight. Immediately after taking out from this electrolyte solution, the cathode was irradiated with UV radiation of 365 nm wavelength at an intensity of 80 mW/cm² for two minutes to form a polymer electrolyte layer integrally with the cathode. The total thickness of the cathode including the integral polymer electrolyte layer remained almost the same as before this step. The battery was assembled by the same procedure as in Example 1.

The batteries manufactured in Example 1 and Comparative Example 1 were discharged at constant current levels of 4, 10, 20 and 40 mA, respectively until the battery voltage decreased to 2.5 V. The discharge capacity of each battery was measured after discharging at each current level. The results are shown in the graph of FIG. 1.

The quantity of the monomer and dimer in the cathode was determined immediately after fabrication using supercritical chromatography. The quantities of the monomer and dimer were 75 weight % and 5 weight %, respectively based on the monomer quantity in the precursor solution in the cathode of Example 1, while the monomer and dimer quantities in the cathode of Comparative Example 1 were 22 weight % and 0 weight %, respectively on the same basis.

Example 2

1) Fabrication of Cathode

A dry blend of 100 weight parts of $LiCoO_2$ powder, 10 weight parts of acetylene black as a conductor material and 5 weight parts of PVDF as a binder material was kneaded with an appropriate amount of NMP. The resulting paste was applied on Al foil of 20 μm thickness, dried to remove NMP. The coated foil was compressed and then cut into 30×30 mm size. An aluminum collector tab was attached to the cut piece by welding to prepare a cathode having a thickness of 70 μm.

2) Fabrication of Anode

A dry blend of 100 weight parts of graphite powder having amorphous carbon particles on the surfaces thereof, 1 weight part of graphatized carbon black as a conductor material and 7.5 parts of PVDF as a binder material was kneaded well with an amount of NMP. The resulting paste was applied on Cu foil of 18 μm thickness and dried to remove NMP. The coated foil was compressed and then cut into 30×30 mm size. A Ni collector tab was attached to the cut piece by welding to prepare an anode having a thickness of 60 μm.

3) Nonaqueous Electrolyte Solution $LiBF_4$ was dissolved in a mixed solvent of ethylene carbonate (EC) and γ-butyrolactone (GBL) at a volumeric ratio of 3:7 to prepare a nonaqueous electrolyte solution.

4) Fabrication of Polymer Electrolyte Layer Cathode Side:

Into the above nonaqueous electrolyte solution was dissolved a monofunctional polyether monoacrylate having a molecular weight of about 220 of the formula:

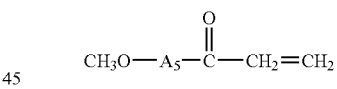

wherein $A_5$ is a polyoxyalkylene chain containing at least 3 EO units and at least one PO unit at PO/EO ratio of 0.25 to a concentration of 5 weight %. To this solution was added DMPA to a concentration of 0.1 weight % to prepare a precursor solution.

The cathode was pre-impregnated with the above precursor solution by dipping the cathode overnight. Separately, a second electrolyte solution containing 5 weight % of the trifunctional polyether polyacrylate having a molecular weight of about 8,000 as used in Example 1 and 0.1 weight % of DMPA was prepared. Then the second precursor solution was applied onto the pre-impregnated cathode. The coated cathode was irradiated with UV radiation of 365 nm wavelength at an intensity of 8 mW/cm² for 10 minutes to form a polymer electrolyate layer having a thickness of 20 μm integrally with the cathode.

Anode Side:

Into the above nonaqueous electrolyte solution was dissolved the bifunctional polyether polyacrylate having a molecular weight of about 3,000 as used in Example 1 to a concentration of 5 weight %. The anode was pre-impregnated with the above precursor solution containing DMPA at a 0.1 weight % concentration by dipping overnight. Separately, a second precursor solution was prepared by dissolving the trifunctional polyether polyacrylate having a molecular weight of about 8,000 as used in Example 1 to a 5 weight % concentration. After adding DMPA at the same concentration as above, the second precursor solution was applied on the pre-impregnated anode. The coated anode was then irradiated with UV radiation of 365 nm wavelength at a intensity of 8 mA/cm$^2$ for 10 minutes to form a polymer electrolyte layer having a thickness of 20 μm integrally with the anode.

5) Assembly of Battery

Same as in Example 1

Comparative Example 2

Example 2 was repeated except that the pre-impregnation step of each electrode was dispensed with and each electrode was directly coated with a precursor solution containing the above trifunctional polyether polyacrylate having a molecular weight of about 8,000 at a concentration of 10 weight % and DMPA at a concentration of 0.1 weight %. The coated anode and cathode were each irradiated with UV radiation of 365 nm wavelength at an intensity of 16 mW/cm$^2$ for 10 minutes to form a polymer electrolyte layer having a thickness of 20 μm integrally with the respective electrodes.

Example 3

Example 2 was repeated except that particulate artificial graphite was used as such as an anodic electroactive substance.

The batteries manufactured in Example 2, Comparative Example 2 and Example 3 were charged at a constant current of 10 mA to reach a battery voltage of 4.1 V. Thereafter the charge was continued at a constant voltage for a total charge time of 3 hours. Each battery was then discharged at constant current levels of 4, 10, 20 and 40 mA, respectively until the battery voltage decreased to 2.75 V. The discharge capacity of each battery was measured after discharging at each current level. The results are shown in the graph of FIG. 2.

The quantity of the monomer and dimer in the respective cathodes and anodes was determined immediately after fabrication using supercritical chromatography and the results thereof are shown in the table below.

| Example | Electrode | Monomer (wt. %)* | Dimer (wt. %)* |
|---------|-----------|------------------|----------------|
| 2 | Cathode | 35 | 1 |
|   | Anode | 68 | 2 |
| 3 | Cathode | 35 | 1 |
|   | Anode | 50 | 1 |
| Comp. Ex. 2 | Cathode | 12 | 0 |
|   | Anode | 26 | 1 |

*Based on the monomer in the starting precursor solution.

From the above results, it is apparent that the internal resistance within the battery may be decreased and the the discharge characteristics at a high current level under high loads may be improved by increasing the proportion of the precursor monomer and/or dimer in either electrode.

Then the batteries manufactured in Example 2, Comparative Example 2 and Example 3 were charged as above and discharged at a constant current of 10 mA until the battery voltage decreased to 2.75 V. After repeating, this charge-discharge cycle, the decrease in the discharge capacity was measured over the number of repeated cycles. The results are shown in the graph of FIG. 3. It is apparent from these results that the batteries of Examples 2 and 3 are excellent in the discharge cycle characteristics compared to the battery of Comparative Example 2 and that the battery of Example 2 wherein the anodic electroactive substance is graphite powder having amorphous carbon attached to the surfaces thereof exhibits higher discharge capacity performance than the battery of Example 3 wherein the graphite powder as such is the anodic electroactive substance. This is because side reactions of the anodic electroactive substance have been retarded.

The invention claimed is:

1. A lithium secondary battery comprising an anode having a layer of electroactive substance comprised of a carbonaceous material capable of electrochemically inclusion and release of lithium, a cathode having a layer of electroactive substance comprised of a chalcogenide compound containing lithium, and a polymer electrolyte layer sandwiched between the cathode and the anode, said polymer electrolyte layer being comprised of a matrix of a crosslinked ion-conductive polymer retaining a nonaqueous electrolyte solution, wherein said cathode and anode contain in the interior thereof a precursor monomer of said ion-conductive polymer in a proportion from 30 to 80% by weight based on the total weight of said monomer before polymerization, and wherein the precursor monomer of said ion-conductive polymer present within said cathode and anode has a polymerization functionality equivalent weight smaller than the polymerizable functionality equivalent weight of the precursor monomer used in the fabrication of the polymer electrolyte sandwiched between the cathode and the anode.

2. The lithium secondary battery according to claim 1, wherein said ion-conductive polymer is a homo- or copolymer of polyether polyol poly(meth)acrylate including an ethylene oxide unit and optionally a propylene oxide unit in the polyether chain.

3. The lithium secondary battery according to claim 1, wherein the anodic electroactive substance is particulate graphite having amorphous carbon attached to the surfaces thereof.

4. The lithium battery according to claim 2, wherein said homo- or copolymer of polyether polyol poly(meth) acrylate is a polymerization product of at least one polyfunctional monomer selected from the group consisting of a monomer of the formular I:

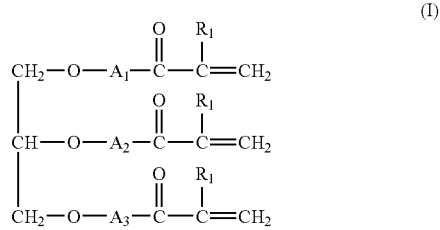

wherein R$_1$ is hydrogen or methyl, A$_1$, A$_2$, and A$_3$ are each a polyoxy-alkylene chain containing an ethylene oxide unit and optionally a propylene oxide unit; and a monomer of the formula II:

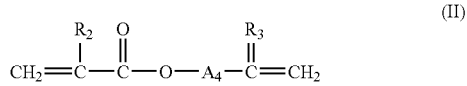

wherein $R_2$ and $R_3$ are each hydrogen or methyl, and $A^4$ is a poly-alkylene oxide chain containing an ethylene oxide unit and optionally a propylene oxide unit.

5. The lithium battery according to claim 4, wherein said polymerization product further comprises a monofunctional monomer of the formula III:

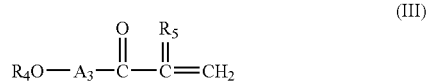

wherein $R_4$ is a lower alkyl, $R_5$ is hydrogen or methyl, and $A_5$ is a polyoxyalkylene chain containing an ethylene oxide unit and optionally a propylene oxide unit.

6. A lithium battery comprising an anode having a layer of electroactive substance layer comprised of lithium metal or a lithium alloy, a cathode having a layer of electroactive substance comprised of a chalcogenide compound selected from the group consisting of $TiS_2$, $SiO_2$, $SnO$, $V_2O_5$, $V_6O_{12}$, $Nb_2O_5$, $BiO_3$, $Sb_2O_3$, $CrO_3$, $Cr_2O_3$, $MoS_2$, $WO_3$, $SeO_2$, $MnO_2$, $Mn_2O_3$, $Fe_2O_3$, $Fe_3O_4$, $NiO_3$, $CoS_3$ and $CoO$, and a polymer electrolyte layer sandwiched between the cathode and the anode, said polymer electrolyte layer being comprised of a matrix of a crosslinked ion-conductive polymer retaining a nonaqueous electrolyte solution, wherein said cathode contains in the interior thereof a precursor monomer of said ion-conductive polymer in a proportion from 30 to 80% by weight based on the total weight of said monomer before polymerization, and wherein the precursor monomer of said ion-conductive polymer present in said cathode has a polymerizable functionality equivalent weight smaller than the polymerizable functionality equivalent weight of the precursor monomer used in fabrication of the polymer electrolyte sandwiched between the cathode and the anode.

7. The lithium battery according to claim 6, wherein said ion-conductive polymer is a homo- or copolymer of polyether polyol poly(meth)acrylate including an ethylene oxide unit and optionally a propylene oxide unit in the polyether chain.

8. The lithium battery according to claim 7, wherein said homo- or copolymer of polyether polyol poly(meth)acrylate is a polymerization product of at least one polyfunctional monomer selected from the group consisting of a monomer of the formula I:

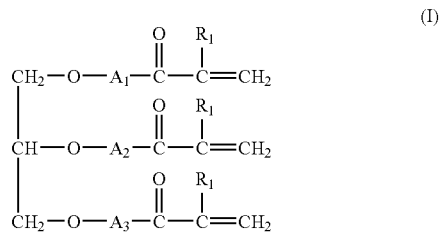

wherein $R_1$ is hydrogen or methyl, $A_1$, $A_2$ and $A_3$ are each a polyoxy-alkylene chain containing an ethylene oxide unit and optionally a propylene oxide unit; and a monomer of the formula II:

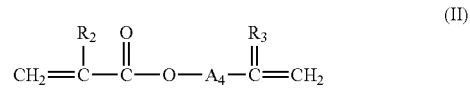

wherein $R_2$ and $R_3$ are each hydrogen or methyl, and $A_4$ is a poly-alkylene oxide chain containing an ethylene oxide unit and optionally a propylene oxide unit.

9. The lithium battery according to claim 8, wherein said polymerization product further comprises a monofunctional monomer of the formula III;

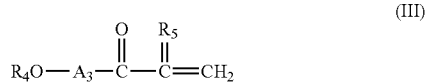

wherein $R_4$ is a lower alkyl, $R_5$ is hydrogen or methyl, and $A_5$ is a polyoxyalkylene chain containing an ethylene oxide unit and optionally a propylene oxide unit.

* * * * *